(12) United States Patent
Glinz et al.

(10) Patent No.: US 6,463,976 B1
(45) Date of Patent: Oct. 15, 2002

(54) VEHICLE WHEEL WITH EMERGENCY RUNNING SUPPORT BODY

(75) Inventors: Michael Glinz, Neustadt (DE); Hans Bernd Hellweg, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/509,557

(22) PCT Filed: Oct. 15, 1998

(86) PCT No.: PCT/EP98/06530

§ 371 (c)(1),
(2), (4) Date: Jun. 20, 2000

(87) PCT Pub. No.: WO99/19158

PCT Pub. Date: Apr. 22, 1999

(30) Foreign Application Priority Data

Oct. 15, 1997  (DE) .......................... 197 45 409

(51) Int. Cl.⁷ ............................ B60C 17/00; B60C 3/00
(52) U.S. Cl. .................... 152/520; 152/155; 152/331.1; 152/516
(58) Field of Search .......................... 152/331.1, 333.1, 152/334.1, 335.1, 516, 518, 520, 155, 156, 158, 196–198, 339.1, 340.1

(56) References Cited

U.S. PATENT DOCUMENTS

| | | | |
|---|---|---|---|
| 3,610,308 A | | 10/1971 | McDonald |
| 4,177,849 A | | 12/1979 | Osada |
| 4,467,852 A | * | 8/1984 | Ippen et al. ................ 152/158 |
| 5,109,905 A | * | 5/1992 | Lambe .................... 152/339.1 |
| 5,479,974 A | * | 1/1996 | Noggle et al. ........... 152/333.1 |

FOREIGN PATENT DOCUMENTS

| | | |
|---|---|---|
| DE | 1022483 | 1/1958 |
| DE | 3507045 | 8/1986 |
| DE | 3507046 | 8/1986 |
| EP | 159274 | 10/1985 |
| EP | 0860304 | 8/1998 |
| GB | 2000733 | 1/1979 |

OTHER PUBLICATIONS

An English Language abastract of EP 0 860 304.

* cited by examiner

*Primary Examiner*—Michael W. Ball
*Assistant Examiner*—Justin Fischer
(74) *Attorney, Agent, or Firm*—Greenblum & Bernstein, P.L.C.

(57) ABSTRACT

A vehicle wheel including a wheel rim, a pneumatic tire comprising a tread and first and second side walls, wherein each of the first and second side walls comprise a bead having a bead core, an emergency running support body including an emergency running surface and first and second axial outer wall sections, the emergency running support body further comprising the shell-shaped ring body adapted to be disposed within the tire and to support the tire in case of damage, a first ring-shaped supporting element, and a second ring-shaped supporting element, whereby the first axial outer wall section is supported on the wheel rim via the first ring-shaped supporting element and the second axial outer wall section is supported on the wheel rim via the second ring-shaped supporting element, wherein the shell-shaped ring body is one of removably connected and removably attached to one of the first ring-shaped support element and the second ring-shaped support element, and wherein one of the first ring-shaped supporting element and the second ring-shaped supporting elements is one of elastically deformable and swivelable in an axial direction.

21 Claims, 4 Drawing Sheets

VEHICLE WHEEL WITH EMERGENCY RUNNING SUPPORT BODY

CROSS-REFERENCE TO RELATED APPLICATIONS

The present application is a U.S. National Stage Application of International Application No. PCT/EP98/06530, filed on Oct. 15, 1998, and claims priority under 35 U.S.C. §119 of German Application No. 197 45 409.7, filed on Oct. 15, 1997.

BACKGROUND OF THE INVENTION

1. Field of the Invention

The present invention relates to a vehicle wheel with an emergency running support body for a pneumatic tire affixed to a wheel rim, which tire has essentially one tread, two side walls, one casing, reinforcement elements, as well as two tire beads provided with bead cores, in which the emergency running support body is formed as a shell-shaped ring body within the tire which has an emergency running surface that supports the tire in the case of damage and supports itself on the wheel rim with its two axial outer wall sections via ring-shaped supporting elements.

2. Discussion of Background Information

A wheel provided with an emergency running support body is disclosed in DE-OS 35 07 046, in which the emergency running body shown there is composed of an exterior metallic reinforcing ring and a cushioning ring arranged between the reinforcing ring and the rim. With this type of wheel, it is necessary for the emergency running support body and the wheel to be applied to the rim in an extensive assembly process in which particularly the emergency running body and the reinforcing ring must be carefully fixed in the well base. It is unfavorable that assembly that can be performed in a reasonable amount of time without great effort is not possible with this system.

U.S. Pat. No. 3,610,308 shows a tire with emergency running capabilities in which the tire beads extend toward the inside of the tire and are formed as emergency running bodies against which the underside of the tire tread can position itself. However, due to the relatively narrow bearing surface that is available during emergency running for bearing the tread, such a formation of an emergency running body causes heavy strain and premature wear to the rubber parts that are rubbing or sliding against one another. In addition, the tire beads formed as the emergency running support body can also displace into the well base and thus promote peeling of the tire.

The disadvantage of this type of peeling in emergency running is reduced somewhat by a solution as disclosed, for instance, in DE-AS 10 22 483, in which projections are arranged beneath the tread on the surface facing the hollow space of the tire, which produce a connection, which is effective with transverse force, between the tread and the emergency running rings formed on the tire beads. Fabricating this type of tire equipped with projections is relatively expensive and, in addition, the fabrication of tires with emergency running support bodies must be purposefully adapted and planned as a deviation from the normal production process.

SUMMARY OF THE INVENTION

Thus, the invention provides for a vehicle wheel for tires with an emergency running support body that can be mounted easily and without special effort on standard well-base rims, which maintains safe vehicle handling and adequate elastic rolling characteristics during emergency running, which can transmit cornering forces without an excessive increase in weight and safely counteracts peeling of the tire, and which flexibly permits combining (even subsequently) with pre-existing types of tires and ready-made tires so that separate fabrication and logistics do not necessarily have to be reserved.

In this connection, at least one of the minimum of three parts that form the emergency running body and are composed of the shell-shaped ring body and at least two ring-shaped support elements, is formed as a separate component that completes the emergency running support body once the tire has been mounted on the rim.

The design of the parts that form the emergency running support body in such a way that enables completion initially during assembly also permits, along with a previously unachieved variable design of the emergency running support body, any degree of prefabrication or partial fabrication of an emergency running support body adaptable to every rim and tire shape, which allows the current geometric circumstances to be taken into consideration in an optimal manner.

In this process, at least one of the axial outer wall sections of the shell-shaped ring body is advantageously detachably connected to the associated first ring-shaped supporting element and at least the second ring-shaped supporting element associated with the other of the axial outer wall sections of the shell-shaped ring body is formed to be elastically deformable and/or swivelable in the axial direction.

The detachable connection permits extraordinarily simple mounting of the tire on the rim, in which the shell-shaped ring body, optionally in connection with additional parts, is first placed loosely within the tire cavity and then a tire bead and optionally a first support element as a part of the emergency running support body is mounted in the normal manner via the well base on the one bead seat. Then, the detachable connection between the shell-shaped ring body situated in the tire cavity and the first supporting element can be closed after the appropriate positioning of the ring body.

As a result of the design of the second ring-shaped supporting element as elastically deformable and/or swivelable in the axial direction, during assembly to mount the second tire bead, the second supporting body is elastically molded toward the center of the tire so that the second tire bead can slide into the well base. Subsequently, the tire bead is raised on the bead seat, whereupon the second supporting element elastically follows the tire bead and springs back into the original position next to and adjacent to it so that radial strains can be absorbed.

The elasticity of the second supporting element is designed in this case in such a way that adequate restoring force is present to overcome the rim hump, which fixes both the supporting element and the tire bead that is adjacent above it in their positions on the interior side.

In the same way, if a tire change of the shell-shaped ring body already located in the tire cavity becomes necessary, for instance, due to corresponding tread performance, the connection with the associated supporting element can be detached, while the other elements, but at least the shell-shaped ring body, can be used again with a tire that can be newly mounted.

The supports of at least the first supporting element on the rim and/or the associated detachable connection are formed advantageously as a snap-in or snap-on connection.

This further facilitates assembly and, at the same time, allows simple and precise positioning of the ring body with a corresponding elastic design of the snap-in or snap-on mechanisms. When replacing the tire, this type of snap-in or snap-on connection is just as easy to detach and to precisely position another time.

In another advantageous further development, the detachable connection between the one axial outer wall section of the shell-shaped ring body and the associated first ring-shaped supporting element as well as its support on the rim is formed as a fixed bearing for the ring body that acts in the axial and radial direction after wheel assembly.

In this connection, the supporting element that is formed as a fixed bearing has a ring collar for receiving the radial outer wall section of the shell-shaped ring body, which axially and radially fixes the shell-shaped ring body. This ring collar permits both a fixing of the ring body at the supporting element and a detachable connection to be realized equally simply and, in both cases, produces a secure bearing and mounting as well as establishes a highly stressable emergency running support body.

Due to such a embodiment, one also obtains a secure fixing of the shell-shaped ring body or the entire emergency running support body already during assembly, which clearly facilitates mounting of the second tire bead. On the other hand, however, it is also possible hereby, even before mounting the second tire bead during assembly, to control the correct seat and positioning of the shell-shaped ring body and thus guarantee an extraordinarily secure emergency running function without great assembly effort.

In accordance with such a construction, the other of the axial outer wall sections of the shell-shaped ring body is then firmly connected in a form locking or force-locking manner to the second ring-shaped supporting element, with the support of the second ring-shaped supporting element on the rim being formed as a movable bearing in the axial direction.

Particularly in coordination with a first connection that is formed as a snap-on or snap-in connection between the outer wall sections and a first supporting body, due to this design, provision can be made for a partial pre-assembly, namely of the shell-shaped ring body and the second supporting element, which further facilitates assembly and mounting the tire on the rim. In addition, the design as a movable bearing produces, in connection with the fixed bearing arranged on the other side, a desirable tolerance during assembly against fabrication and assembly inaccuracies with simultaneous, highly precise positioning of the shell-shaped ring body that is due to the fixed bearing.

This advantage is retained even with operation under unfavorable strains since, with such a design, neither dynamic strains nor the influences of temperature are able to detrimentally affect the correct seat of the shell-shaped ring body relative to the tire, which is defined by the one fixed bearing.

Another great advantage of the embodiment in accordance with the invention is yielded in cooperation with the previously named characteristics to the effect that the supporting element that extends inwardly into the tire cavity can be adapted in terms of its cross section to the necessities of assembly and to the operating performance during emergency running. As a rule, this leads to the supporting elements for the outer wall sections of the shell-shaped ring body being formed asymmetrically in such a way that the initially mounted first ring-shaped supporting element, for example, already has an axial stop for the ring body and a supporting or stopping face formed for holding during assembly.

The advantage of the embodiments mentioned continues to be that the vehicle wheel that is provided with such an emergency running support body in accordance with the invention is not dependent upon or adapted to a particular rim shape or rim design and can be attached to every rim, e.g., every passenger vehicle well-base rim, and can also be used for conventional tire types without emergency running protection systems or bodies.

Such an adaptation of the cross-section is also achieved by a different size with the same cross-section shape of the supporting element.

In addition, it is possible with the embodiment of the vehicle wheel in accordance with the invention to use conventional tire types only by completion and combination with other adapted components for making an emergency running property available.

Finally, due to the embodiment of the vehicle wheel in accordance with the invention, the establishment of the emergency running property or the emergency running support body can be carried out at an arbitrary time during or after tire manufacturing, while until now it always had to be already decided during production planning when and what quantities of tire types were to be produced with emergency running properties.

At least one of the supporting elements is advantageously formed as a rubber elastic component of the tire connected with the tire beads and essentially extends inwardly within the hollow space of the tire.

Depending upon the material selected for the supporting elements, its connection to the tire beads can now occur at different points in time, for example, via vulcanization directly during vulcanization of the finished tires or by cold vulcanization or adhesion in a special finishing operation or even directly by the tire supplier or at the operation that mounts the tires on the rim.

Another advantageous embodiment utilizes at least one of the supporting elements being fastened by foaming of an elastic liquid foam that can be hardened in a mold before the tire is mounted. Spraying the foam in a mold that can be positioned with respect to the tire beads results in a very good adaptation of the supporting elements to the surface of the tire beads and a very durable connection after the foam has hardened.

The second ring-shaped supporting element beneath the form-locking or force-locking firm connection with the outer wall sections of the shell-shaped ring body advantageously has a cut running over the circumference and extending transverse to the circumferential direction from the side of the tire to the center of the tire over a partial width of the supporting element.

In the cross section of the supporting element, this achieves the formation of a narrow zone that is flexible with respect to flexural strength, which permits particularly simple deformation or a joint-like folding of the supporting element and thus a further simplified assembly.

While the deflection of axial forces is thus substantially eased, the absorption of radial forces is not restricted so that, after springing back into the supporting position, the ring-shaped supporting element is completely ready for deployment. In a corresponding design, mounting the second tire bead on the bead seat after temporary positioning in the well base is just as easy to carry out here as would be the case without a supporting element and a ring body.

As already mentioned, the functional division into a movable bearing and a fixed bearing and the characteristics already mentioned result in the advantage that the cross section, particularly of the connection segment that is formed as a movable bearing, can be adapted at will and, in terms of its shape, to the best possible compromise between ease of assembly and excellent product properties in operation.

Advantageously, the minimum inside diameter of the tread section of the tire under load exceeds the maximum outside diameter of the shell-shaped ring body by at least 35 mm. To be understood as the inside diameter of the tread section under load is the diameter, which is computed from the "static radius," which is reduced by the overall thickness of the tread and then doubled, with the static radius being the radius that is dropped as a perpendicular from the wheel axis to the outside of the tire contact area when the vehicle is standing still.

Along with the reduction in the supporting element mass as such, a more precise centering and connection of the moved masses to the rims also occurs, which results in a high tolerance for unbalanced influences in an operating state. The weight of the wheel is also just slightly increased. In addition, due to the arrangement of the shell-shaped ring body that likewise occurs close to the rim, excellent emergency running behavior is achieved as well as the possibility of being able to provide this type of emergency running system for almost all height-to-width ratios.

The shell-shaped ring body is advantageously formed as a non-closed slot ring. This results in another possibility of reducing the supporting elements as well as the arrangement in the rim vicinity of all the emergency running components. Due to the slot-shaped design, the shell-shaped ring body or its outer wall sections can be produced in diameters, which do not or only insignificantly exceed the diameter of the rim flange or the rim. Due to such a formation, the possibility namely exists during assembly of introducing the slotted ring into the tire cavity due to its helical rebounding after a tire bead has already been fixed on the bead seat. After introduction, the shell-shaped ring body then again assumes its original shape with a smaller diameter.

An advantageous further development of this design is that at least one spreader element that functions during assembly and increases the diameter of the ring body is arranged in the slot area of the ring body, which spreader element creates a slightly increased assembly diameter so that insertion into the tire cavity can be performed unproblematically. If the ring body is now lying in the tire cavity, the slot can be closed by catching with a spring, for example, by pressing a spreader spring towards the inside of the ring body, whereby the ring body is returned to its reduced operating diameter. When changing a tire, the spreader spring can be snapped back into its holding position by spreading the tire body with a tool, after which the ring body can be removed and optinally used inside a new tire.

Particularly with the application in connection with a slotted ring, another advantageous embodiment results from at least one of the axial outer wall sections of the shell-shaped ring body having a clamping profile on its end section, with the associated supporting element being formed as a complement thereto and having a negative shape corresponding to the clamping shape.

The supporting element can then easily be pushed in the circumferential direction onto an axial outer wall section of the spread ring body, thus establishing a secure and, depending on the elasticity of the supporting element, almost non-detachable connection.

On the other hand, another possibility for forming a snap-in or snap-on connection is yielded with this type of design in the case of correspondingly great elasticity of the supporting element and with an adaptation of the clamping profile.

In another advantageous formation, one or more spring-elastic elements that are distributed over the circumference of the rim and that axially spread the supporting elements are arranged between the ring-shaped supporting elements. Particularly in the case of the embodiment of the shell-shaped ring body as a slotted ring with a clamping profile and supporting elements that are formed to be complementary, prestress of the supporting elements that is somewhat reduced in the axial direction and the lack of a bearing on the tire beads can be compensated for thereby.

Furthermore, a vehicle wheel is disclosed with an emergency running support body for a tire affixed to a wheel rim, which has essentially one tread, two side walls, one casing, reinforcement elements, as well as two tire beads provided with bead cores, in which the emergency running support body is formed as a shell-shaped ring body within the tire, which has an emergency running surface that supports the tire in the case of damage and supports itself on the wheel rim with its two axial outer wall sections via ring-shaped supporting elements, in which the shell-shaped ring body has rubber elastic linings on its emergency running surface. Such a formation increases the driving comfort present during emergency running to a distinct degree.

The cross-section of the ring-shaped supporting elements can naturally also be designed variably over the circumference, for example, for reasons of weight reduction. Conceivable in this case are shapes in which the support on the rim occurs only in sections at intervals of 60° at a time over the circumference so that a bearing of the supporting elements on the bead seat occurs only via the "supporting feet" and the intermediate section is bridged by reduced cross-sections. It is also possible to reduce only the width of the supporting elements over the circumference.

According to one aspect of the invention there is provided a vehicle wheel having an emergency running support body for a pneumatic tire affixed to a wheel rim, which has essentially one tread, two side walls, one casing, reinforcement elements, as well as two tire beads provided with bead cores, in which the emergency running support body is formed as a shell-shaped ring body within the tire, which has an emergency running surface that supports the tire in the case of damage and supports itself on the wheel rim with its two axial outer wall sections via ring-shaped supporting elements, characterized in that at least one of the minimum of three parts forming the emergency running body and comprising the shell-shaped ring body and two ring-shaped support elements is formed as a separate component that completes the emergency running support body once the tire has been mounted on the rim.

At least one of the axial outer wall sections of the shell-shaped ring body may be detachably connected with the associated first ring-shaped supporting element and at least the second ring-shaped supporting element associated with the other of the axial outer wall sections of the shell-shaped ring body is formed to be elastically deformable and/or swivelable in the axial direction.

The support of at least the first supporting element on the rim and/or the associated detachable connection may be formed as a snap-in or snap-on connection.

At least one of the supporting elements may be formed as a rubber elastic component of the tire connected with the tire beads and essentially extends inwardly within the hollow space of the tire.

At least one of the supporting elements may comprise elastic thermosetting liquid foam and is connected by foaming with a tire bead before mounting the fully vulcanized and ready-made tire on the wheel rim.

The detachable connection between the one axial outer wall section of the shell-shaped ring body and the associated first ring-shaped supporting element as well as its support on the rim may be formed as a fixed bearing for the ring body that acts in the axial and radial direction after wheel assembly.

The second ring-shaped supporting element beneath the form-locking or force-locking firm connection with the outer wall sections of the shell-shaped ring body has a cut running over the circumference and extending transverse to the circumferential direction from the side of the tire to the center of the tire over a partial width of the supporting element.

The minimum inside diameter of the tread of the tire under load may exceed the maximum outside diameter of the shell-shaped ring body by at least 35 mm.

The shell-shaped ring body may be formed as a non-closed slot ring.

At least one of the axial outer wall sections of the shell-shaped ring body may have a clamping profile on its end section, with the associated supporting element being formed as a complement thereto and having a negative shape corresponding to the clamping profile.

At least one spreader element that functions during assembly and increases the diameter of the ring body may be arranged in the slot area of the ring body.

One or more spring-elastic elements that are distributed over the circumference of the rim and that axially spread the supporting elements may be arranged between the ring-shaped supporting elements.

According to another aspect of the invention, there is provided a vehicle wheel with an emergency running support body for a tire affixed to a wheel rim, which has essentially one tread, two side walls, one casing, reinforcement elements, as well as two tire beads provided with bead cores, in which the emergency running support body is formed as a shell-shaped ring body within the tire, which has an emergency running surface that supports the tire in the case of damage and supports itself on the wheel rim with its two axial outer wall sections via ring-shaped supporting elements, characterized in that the shell-shaped ring body has rubber elastic linings on its emergency tread.

The invention also provides for a vehicle wheel including a wheel rim, a pneumatic tire comprising a tread and first and second side walls, wherein each of the first and second side walls comprise a bead having a bead core. An emergency running support body includes an emergency running surface and first and second axial outer wall sections. The emergency running support body further includes a shell-shaped ring body adapted to be disposed within the tire and to support the tire in case of damage. A first ring-shaped supporting element and a second ring-shaped supporting element are provided. The first axial outer wall section is supported on the wheel rim via the first ring-shaped supporting element and the second axial outer wall section is supported on the wheel rim via the second ring-shaped supporting element. The shell-shaped ring body is one of removably connected and removably attached to one of the first ring-shaped support element and the second ring-shaped support element, and one of the first ring-shaped supporting element and the second ring-shaped supporting elements is one of elastically deformable and swivelable in an axial direction.

The tire may include a casing and reinforcement elements. The wheel rim may include a first bead seat and a second bead seat. The first axial outer wall section may be supported on the wheel rim in the area of the first bead seat via the first ring-shaped supporting element and the second axial outer wall section is supported on the wheel rim in the area of the second bead seat via the second ring-shaped supporting element. One of the first and second ring-shaped support elements may include a rubber elastic material. The shell-shaped ring body may be removably connected to the first ring-shaped support element via one of a snap-in connection and a snap-on connection and wherein the second ring-shaped supporting element is one of elastically deformable and swivelable in an axial direction. One of the first and second ring-shaped support elements may include a rubber elastic material. One of the first and second ring-shaped support elements may include an elastic thermosetting liquid foam. One of the first and second ring-shaped support elements may be adapted to be connected by foaming to the inside of the tire in the area of the tire bead.

The shell-shaped ring body may be removably connected to the first ring-shaped support element, the first ring-shaped supporting element providing each of radial support and axial support to the shell-shaped ring body. The shell-shaped ring body may be connected to the second ring-shaped support element, the second ring-shaped supporting element comprising a circumferential cut which is axially oriented and extends a partial width into the supporting element. In a compressed state, the tread of the tire may include a minimum inside diameter, the minimum inside diameter exceeding a maximum outside diameter of the shell-shaped ring body by at least 35 mm. The shell-shaped ring body may include a non-closed slot ring.

One of the first axial outer wall section and the second axial outer wall section may include an end area having an external clamping profile and wherein one of the first and second ring-shaped supporting elements comprises a corresponding internal clamping profile, whereby the external clamping profile projects into and engages the internal clamping profile. Each of the external and internal clamping profiles may include an L-shape.

The vehicle wheel may further include a spreader element disposed between the shell-shaped ring body and the wheel rim, wherein the spreader element functions to separate the shell-shaped ring body from the wheel rim. The vehicle wheel may further include at least one spring-elastic element located on the circumference of the wheel rim, wherein the spring-elastic element axially biases one of the first and second ring-shaped supporting elements towards the tire bead.

The emergency running surface may include an emergency tread having rubber elastic linings. The emergency running surface may include a first and second circular projection and a center circular indentation.

The invention also provides for a vehicle wheel including a wheel rim comprising a first bead seat and a second bead seat. A pneumatic tire includes a tread and first and second side walls. Each of the first and second side walls includes corresponding first and second beads, each bead having a bead core. The first and second beads engage the corresponding first and second bead seats. An emergency running support body includes an emergency running surface and first and second axial outer wall sections. The emergency running surface includes a first and second circular projection and a center circular indentation. The emergency running support body may further include a shell-shaped ring body adapted to be disposed within the tire and to support the tire in case of damage, a removably connected first ring-shaped supporting element, and an axially flexible second ring-shaped supporting element which is attached to the shell-shaped ring body. The first axial outer wall section is supported axially and radially on the wheel rim in the area of the first bead seat via the first ring-shaped supporting element and the second axial outer wall section is supported on the wheel rim in the area of the second bead seat via the second ring-shaped supporting element. Each of the first and second ring-shaped support elements are adapted to support the shell-shaped ring body when they are disposed in the area of the corresponding bead seats. The emergency running support surface is adapted to support the tire from the inside of the wheel rim when the tire is damaged.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
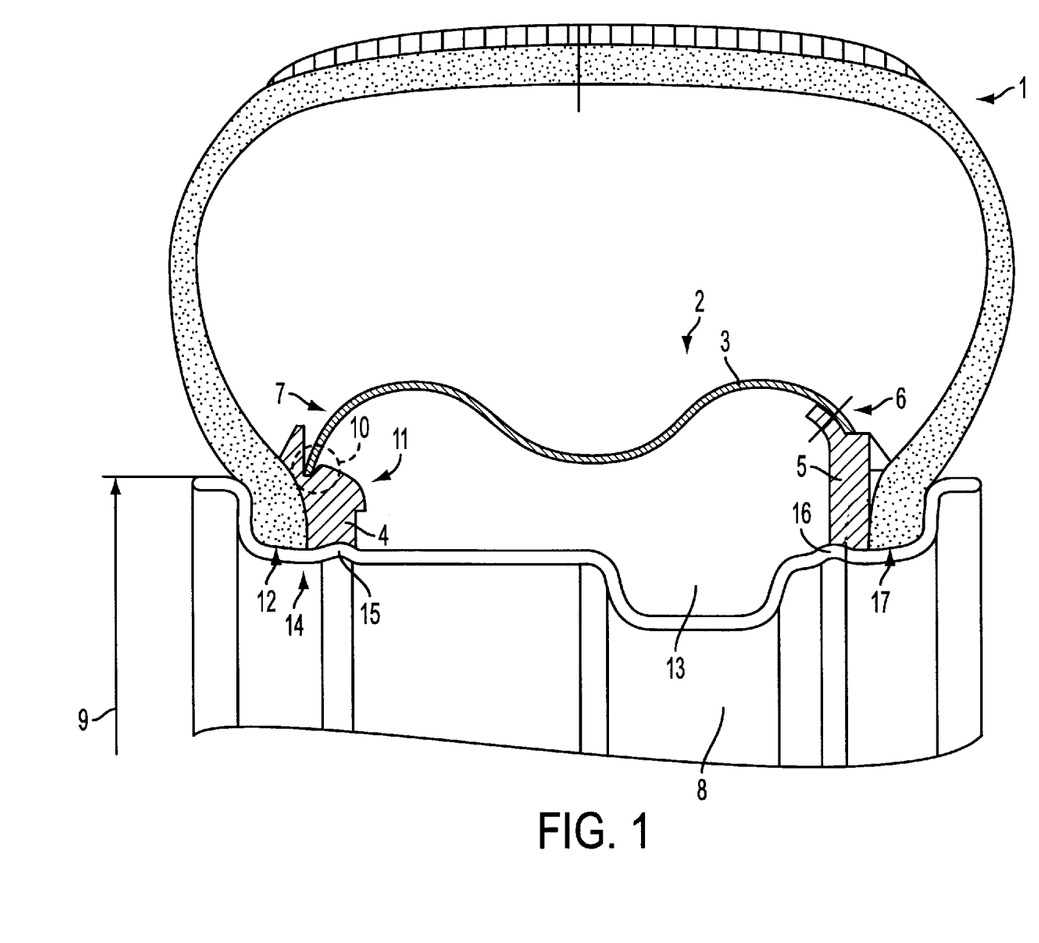
FIG. 1 a vehicle wheel in accordance with the invention with an emergency running support body in cross-section.

FIG. 1 shows a vehicle wheel 1 which is provided with an emergency running support body 2 that is essentially composed of the shell-shaped ring body 3 within the tire and the supporting elements 4 and 5 for the two axial outer wall sections 6 and 7 of the ring body 3. FIG. 1 also shows a commercially available well-base rim 8 with the rim-flange diameter 9.

The one axial outer wall section 7 of the shell-shaped ring body 3 is detachably connected with the associated first ring-shaped supporting element 4 via a snap-in connection 10.

In principle, the snap-in function can be realized either in the ring-shaped supporting element 4 or in the shell-shaped ring body 3 or, as shown here, in both. In this context, the shell-shaped ring body 3 has a certain spring elasticity also in its outer wall sections 6, 7. The supporting element 4 is also composed of an elastic, namely rubber elastic, material and can deflect elastically when pushing the supporting body 2 into the snap groove on the assembly flank 11.

In the exemplary embodiment shown here, assembly in sequence includes first mounting the tire beads 12 through the well base 13 in position on the bead seat 14, after which the supporting element 4 as a ring is also introduced through the well base 13 and is finally put into its position supported by the rim hump 15. During assembly, the shell-shaped ring body 3, whose other of the axial outer wall sections 6 is already firmly connected in a form-locking or force-locking manner with the second ring-shaped supporting element 5, is inserted into the tire cavity.

The next step provides for pressing the shell-shaped ring body 3 into the snap-in connection 10 and it is fixed there already axially and radially completely in the form of a fixed bearing.

The connection of the other of the axial outer wall sections 6 of the shell-shaped ring body 3 to the second ring-shaped supporting element 5 can take place in this connection by being molded on or even by using connecting elements.

Figure 2:
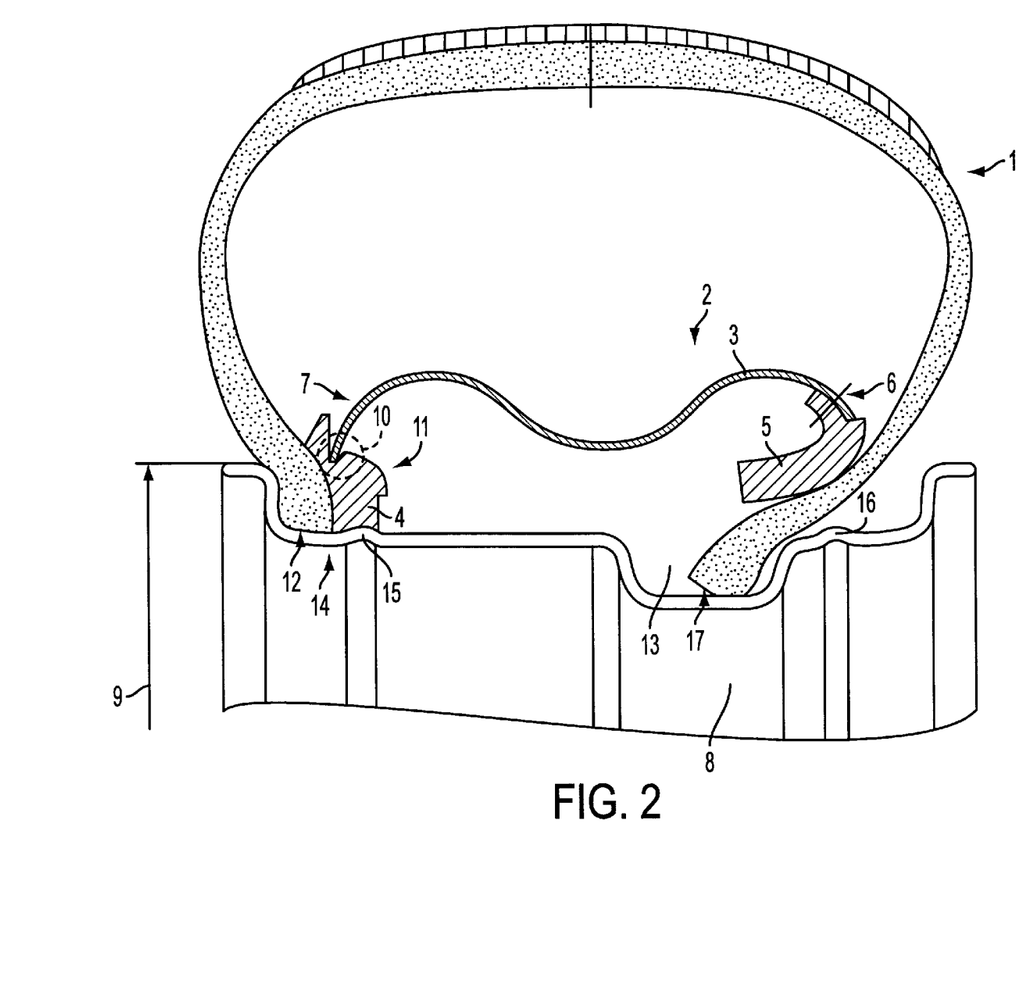
FIG. 2 an intermediate step in the assembly of the vehicle wheel with the emergency running support body shown in FIG. 1.

The supporting element 5 is designed in such a way that, despite the basic fixing by the hump 16, there is a movable bearing function and adequate elasticity that folding or elastic bending towards the inside is possible without hesitation, by which means the second tire bead 17 can slide into the well base 13 so that tire assembly is possible unproblematically. In this regard, FIG. 2 shows the corresponding intermediate step in assembly in which the supporting element 5 is already folded and the tire bead 17 has entered the well base.

After even the tire bead 17 is fixed on the second bead seat, the supporting element 5 springs back into its original position and thus into the operating position. If the elasticity is not adequately designed for rebounding, one or more spring-elastic elements that are distributed over the circumference of the rim and that axially spread the supporting elements can be arranged between the ring-shaped supporting elements, and which spring-elastic elements compensate for a lacking bearing on the tire beads.

As a result of this type of embodiment, the emergency running support body is fixed within the tire cavity as a fixed bearing/movable bearing system, it can absorb all forces occurring during emergency running and can be replaced again without hesitation when changing the tire by the already described steps being carried out in the reverse sequence.

It is clearly visible with this embodiment that the inside diameter of the axial outer wall section 7 corresponds approximately to the rim-flange diameter 9.

Figure 3:
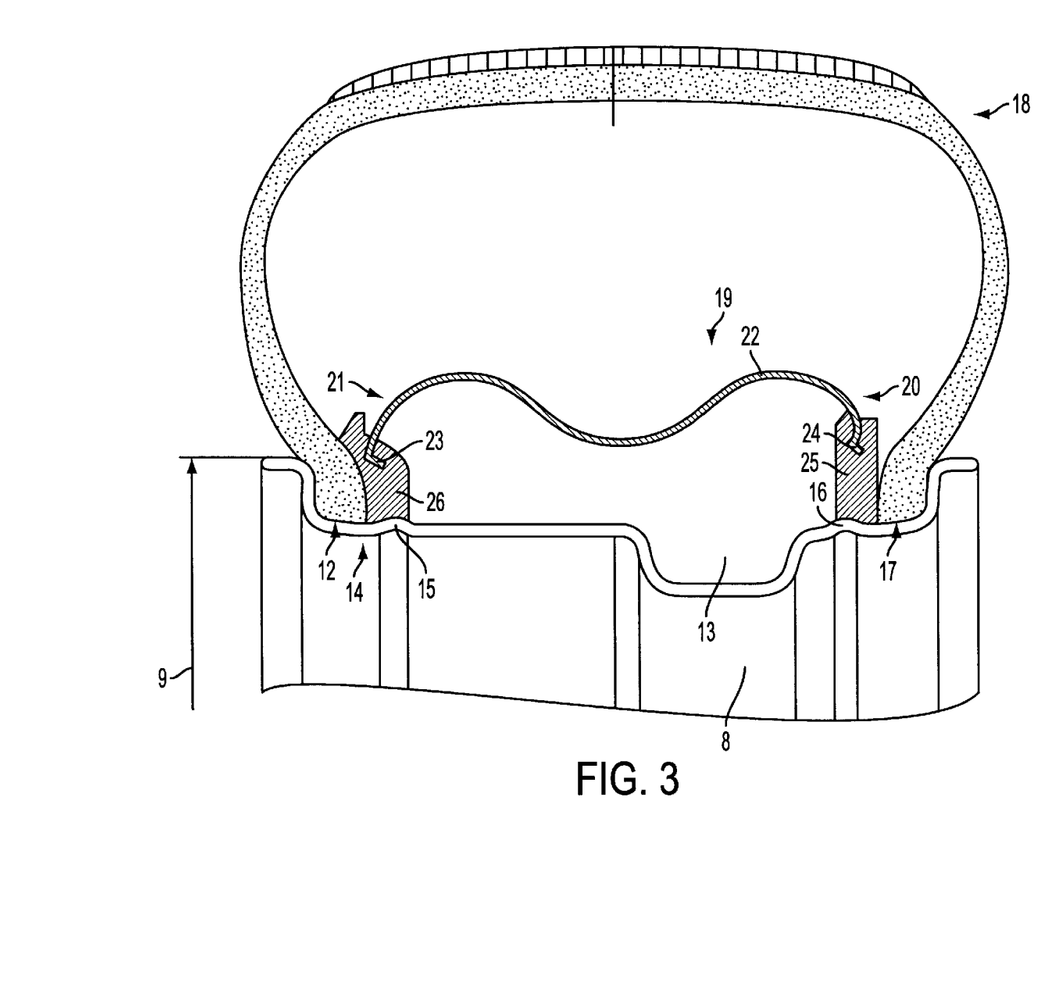
FIG. 3 another vehicle wheel in accordance with the invention with an emergency running support body in cross-section.

FIG. 3 shows another vehicle wheel 18 in accordance with the invention with a slotted emergency running support body 19 in cross-section in which the axial outer wall sections 20 and 21 of the shell-shaped ring body 22 have clamping profiles 23 and 24 on their end sections, with the associated supporting elements 25 and 26 being formed as complements thereto and having a negative shape corresponding to the clamping profiles 23, 24.

Figure 4:
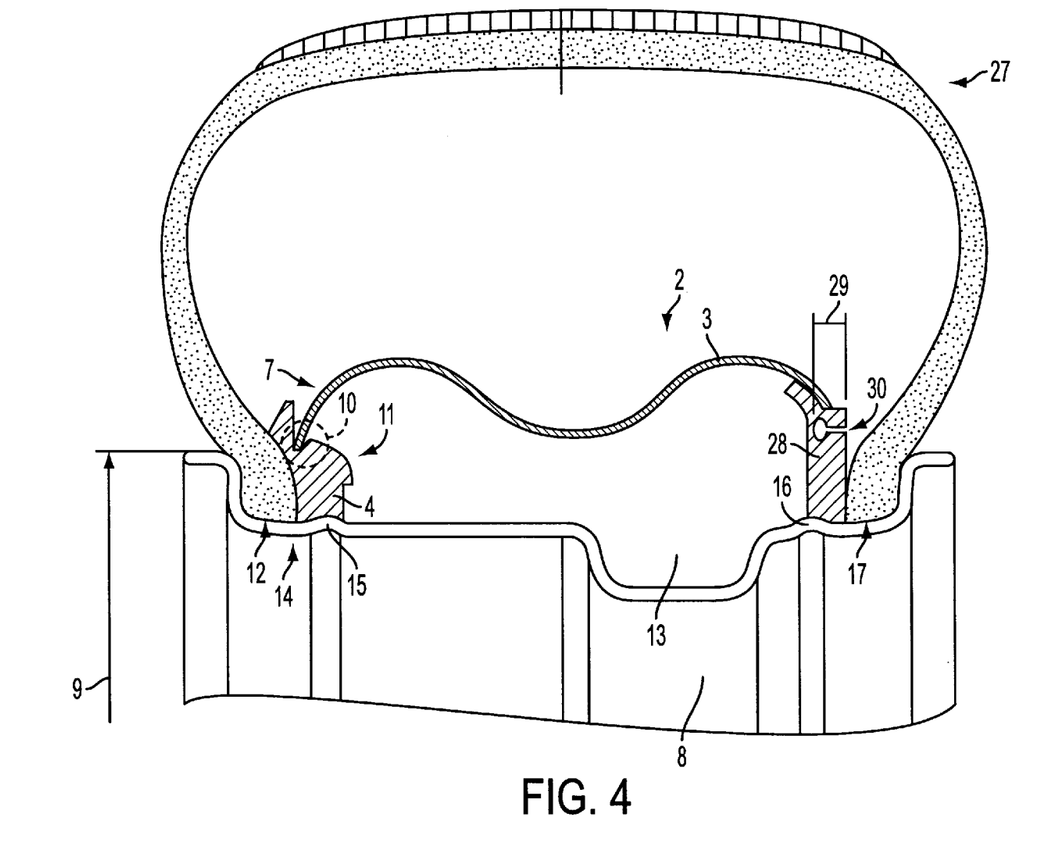
FIG. 4 a vehicle wheel in accordance with the invention with a support element and a cut extending over a partial width of the supporting element.

FIG. 4 shows a vehicle wheel 27 in accordance with the invention with a supporting element 28 and a cut 30 extending over a partial width 29 of the supporting element 28, which permits particularly simple deformation or a joint-like folding of the supporting element 28 and thereby further simplified assembly.

List of Reference Characters

| | |
|---|---|
| 1 | Vehicle wheel |
| 2 | Emergency running support body |
| 3 | Shell-shaped ring body |
| 4, 5 | Supporting element |
| 6, 7 | Axial outer wall section |
| 8 | Well-base rim |
| 9 | Rim-flange diameter |
| 10 | Snap-in connection |
| 11 | Assembly flank |

| | -continued |
|---|---|
| 12 | Tire bead |
| 13 | Well base |
| 14 | Bead seat |
| 15, 16 | Rim hump |
| 17 | Tire bead |
| 18 | Vehicle wheel |
| 19 | Emergency running support body |
| 20, 21 | Axial outer wall section |
| 22 | Shell-shaped ring body |
| 23, 24 | Clamping profile |
| 25, 26 | Supporting element |
| 27 | Vehicle wheel |
| 28 | Supporting element |
| 29 | Partial width |
| 30 | Cut running over the circumference |

What is claimed is:

1. A vehicle wheel comprising:
a wheel rim;
a pneumatic tire comprising a tread and first and second side walls, wherein each of the first and second side walls comprise a bead having a bead core;
an emergency running support body comprising an emergency running surface and first and second axial outer wall sections;
the emergency running support body further comprising a shell-shaped ring body adapted to be disposed within the tire and to support the tire in case of damage, a first ring-shaped supporting element, and a second ring-shaped supporting element, whereby the first axial outer wall section is supported on the wheel rim via the first ring-shaped supporting element and the second axial outer wall section is supported on the wheel rim via the second ring-shaped supporting element,
wherein the shell-shaped ring body is one of removably connected and removably attached to one of the first ring-shaped support element and the second ring-shaped support element, and
wherein one of the first ring-shaped supporting element and the second ring-shaped supporting elements is one of elastically deformable and swivelable in an axial direction.

2. The vehicle wheel of claim 1, wherein the tire comprises a casing and reinforcement elements.

3. The vehicle wheel of claim 1, wherein the wheel rim comprises a first bead seat and a second bead seat.

4. The vehicle wheel of claim 3, wherein the first axial outer wall section is supported on the wheel rim in the area of the first bead seat via the first ring-shaped supporting element and the second axial outer wall section is supported on the wheel rim in the area of the second bead seat via the second ring-shaped supporting element.

5. The vehicle wheel of claim 4, wherein one of the first and second ring-shaped support element comprises a rubber elastic material.

6. The vehicle wheel of claim 1, wherein the shell-shaped ring body is removably connected to the first ring-shaped support element via one of a snap-in connection and a snap-on connection and wherein the second ring-shaped supporting element is one of elastically deformable and swivelable in an axial direction.

7. The vehicle wheel of claim 1, wherein one of the first and second ring-shaped support element comprises a rubber elastic material.

8. The vehicle wheel of claim 1, wherein one of the first and second ring-shaped support elements comprises an elastic thermosetting liquid foam.

9. The vehicle wheel of claim 8, wherein one of the first and second ring-shaped support elements is adapted to be connected by foaming to the inside of the tire in the area of the tire bead.

10. The vehicle wheel of claim 1, wherein one of the first and second ring-shaped support elements is adapted to be connected by foaming to the inside, of the tire in the area of the tire bead.

11. The vehicle wheel of claim 1, wherein the shell-shaped ring body is removably connected to the first ring-shaped support element, the first ring-shaped supporting element providing each of radial support and axial support to the shell-shaped ring body.

12. The vehicle wheel of claim 1, wherein the shell-shaped ring body is connected to the second ring-shaped support element, the second ring-shaped supporting element comprising a circumferential cut which is axially oriented and extends a partial width into the supporting element.

13. The vehicle wheel of claim 1, wherein, in a compressed state, the tread of the tire comprises a minimum inside diameter, the minimum inside diameter exceeding a maximum outside diameter of the shell-shaped ring body by at least 35 mm.

14. The vehicle wheel of claim 1, wherein the shell-shaped ring body comprises a non-closed slot ring.

15. The vehicle wheel of claim 1, wherein one of the first axial outer wall section and the second axial outer wall section comprise an end area having an external clamping profile and wherein one of the first and second ring-shaped supporting elements comprises a corresponding internal clamping profile, whereby the external clamping profile projects into and engages the internal clamping profile.

16. The vehicle wheel of claim 15, wherein each of the external and internal clamping profiles comprise an L-shape.

17. The vehicle wheel of claim 1, farther comprising a spreader element disposed between the shell-shaped ring body and the wheel rim, wherein the spreader element functions to separate the shell-shaped ring body from the wheel rim.

18. The vehicle wheel of claim 1, further comprising at least one spring-elastic element located on the circumference of the wheel rim, wherein the spring-elastic element axially biases one of the first and second ring-shaped supporting elements towards a respective tire bead.

19. The vehicle wheel of claim 1, wherein the emergency running surface comprises an emergency tread having rubber elastic linings.

20. The vehicle wheel of claim 1, wherein the emergency running surface comprises a first and second circular projection and a center circular indentation.

21. A vehicle wheel comprising:
a wheel rim comprising a first bead seat and a second bead seat;
a pneumatic tire comprising a tread and first and second side walls, wherein each of the first and second side walls comprises corresponding first and second beads, each bead having a bead core, wherein the first and second beads engage the corresponding first and second bead seats;
an emergency running support body comprising an emergency running surface and first and second axial outer wall sections, the emergency running surface comprising a first and second circular projection and a center circular indentation;
the emergency running support body further comprising a shell-shaped ring body adapted to be disposed within the tire and to support the tire in case of damage, a removably connected first ring-shaped supporting element, and an axially flexible second ring-shaped supporting element which is attached to the shell-shaped ring body, whereby the first axial outer wall section is supported axially and radially on the wheel rim in the area of the first bead seat via the first ring-shaped supporting element and the second axial outer wall section is supported on the wheel rim in the area of the second bead seat via the second ring-shaped supporting element, wherein each of the first and second ring-shaped support elements are adapted to support the shell-shaped ring body when they are disposed in the area of the corresponding bead seats, and wherein the emergency running support surface is adapted to support the tire from the inside of the wheel rim when the tire is damaged.

* * * * *